(12) United States Patent
Kim et al.

(10) Patent No.: US 10,768,638 B2
(45) Date of Patent: Sep. 8, 2020

(54) METHOD AND DEVICE FOR SWITCHING DRIVING MODES TO SUPPORT SUBJECT VEHICLE TO PERFORM PLATOON DRIVING WITHOUT ADDITIONAL INSTRUCTIONS FROM DRIVER DURING DRIVING

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,513

(22) Filed: Dec. 23, 2019

(65) Prior Publication Data
US 2020/0249699 A1    Aug. 6, 2020

Related U.S. Application Data

(60) Provisional application No. 62/799,219, filed on Jan. 31, 2019.

(51) Int. Cl.
*G05D 1/02*    (2020.01)

(52) U.S. Cl.
CPC ......... *G05D 1/0295* (2013.01); *G05D 1/0297* (2013.01)

(58) Field of Classification Search
CPC combination set(s) only.
See application file for complete search history.

(56) References Cited

U.S. PATENT DOCUMENTS

| 9,940,840 B1* | 4/2018 | Schubert | G01C 21/3407 |
| 10,268,191 B1* | 4/2019 | Lockwood | G05D 1/0022 |

(Continued)

FOREIGN PATENT DOCUMENTS

JP    2008003675 A    1/2008

*Primary Examiner* — Redhwan K Mawari
(74) *Attorney, Agent, or Firm* — Husch Blackwell LLP

(57) ABSTRACT

A method for switching driving modes of a subject vehicle to support the subject vehicle to perform a platoon driving by using platoon driving information is provided. And the method includes steps of: (a) a basement server, which interworks with the subject vehicle driving in a first mode, acquiring first platoon driving information, to N-th platoon driving information by referring to a real-time platoon driving information DB; (b) the basement server (i) calculating a first platoon driving suitability score to an N-th platoon driving suitability score by referring to first platoon driving parameters to N-th platoon driving parameters and (ii) selecting a target platoon driving group to be including the subject vehicle; (c) the basement server instructing the subject vehicle to drive in a second mode.

26 Claims, 4 Drawing Sheets

(56) References Cited

U.S. PATENT DOCUMENTS

| | | | |
|---|---|---|---|
| 2010/0256852 A1* | 10/2010 | Mudalige | G08G 1/163 |
| | | | 701/24 |
| 2012/0270697 A1* | 10/2012 | Takami | B60K 6/387 |
| | | | 477/5 |
| 2017/0287233 A1* | 10/2017 | Nix | G07C 5/008 |
| 2017/0293296 A1 | 10/2017 | Stenneth et al. | |
| 2017/0344023 A1* | 11/2017 | Laubinger | G08G 1/22 |
| 2018/0188746 A1* | 7/2018 | Lesher | G05D 1/0287 |
| 2019/0035284 A1* | 1/2019 | Tam | G08G 1/22 |
| 2019/0171227 A1 | 6/2019 | Sujan et al. | |

* cited by examiner

FIRST CANDIDATE FORMATION

SECOND CANDIDATE FORMATION

METHOD AND DEVICE FOR SWITCHING DRIVING MODES TO SUPPORT SUBJECT VEHICLE TO PERFORM PLATOON DRIVING WITHOUT ADDITIONAL INSTRUCTIONS FROM DRIVER DURING DRIVING

CROSS REFERENCE OF RELATED APPLICATION

This present application claims the benefit of the earlier filing date of provisional patent application No. 62/799,219, filed Jan. 31, 2019, the entire contents of which being incorporated herein by reference.

FIELD OF THE DISCLOSURE

The present disclosure relates to a method and a device for use with an autonomous vehicle; and more particularly, to the method and the device for switching driving modes of a subject vehicle to support the subject vehicle to perform a platoon driving without additional instructions from a driver during driving.

BACKGROUND OF THE DISCLOSURE

The vehicle platooning, which has recently attracted great attention, is a method of driving multiple vehicles in a line. Specifically, the multiple vehicles are connected to each other through a Vehicle-to-Vehicle (V2V) communication, which is one kind of a Vehicle-to-Everything (V2X), and drive safely while maintaining distances between themselves by the aid of at least one leading vehicle capable of controlling steerings, accelerators, and brakes of following vehicles.

The vehicle platooning may have many advantages. For example, the vehicles can improve fuel efficiencies with lower air resistance and thereby reduce the exhaust emission. Further, the multiple vehicles may comply with traffic regulations and thereby there may be an increase in efficiency of road management.

However, the vehicle platooning may also have some disadvantages incurred because the multiple vehicles should drive in company with various kinds of vehicles such as semi-autonomous vehicles and general vehicles as well as autonomous vehicles on the road. For example, the vehicle platooning may not be available occasionally according to certain conditions. Also, in the case drivers should check such conditions, higher possibility of accidents and inefficiency of the vehicle platooning may be incurred.

SUMMARY OF THE DISCLOSURE

It is an object of the present disclosure to solve all the aforementioned problems.

It is another object of the present disclosure to provide a method for supporting safe vehicle platooning of at least one platoon without control of drivers, resulting in lower possibility of accidents.

It is still another object of the present disclosure to provide a method for selecting the best platoon driving group, to thereby provide efficient platoon driving.

It is still yet another object of the present disclosure to provide a method for selecting the most efficient formation for a platoon driving group, to thereby provide efficient platoon driving.

In accordance with one aspect of the present disclosure, there is provided a method for switching driving modes of a subject vehicle to support the subject vehicle to perform a platoon driving by using platoon driving information on platoon driving groups located near the subject vehicle, without additional instructions from a driver during a driving, including steps of: (a) a basement server, which interworks with the subject vehicle driving in a first mode corresponding to a circumstance of being not included in any platoon driving groups, if a platoon driving request is acquired from the subject vehicle, acquiring first platoon driving information, corresponding to a first platoon driving group including one or more first platoon driving vehicles, to N-th platoon driving information, corresponding to an N-th platoon driving group including one or more N-th platoon driving vehicles, by referring to a real-time platoon driving information DB; (b) the basement server (i) calculating a first platoon driving suitability score, corresponding to the first platoon driving group, to an N-th platoon driving suitability score, corresponding to the N-th platoon driving group, by referring to one or more first platoon driving parameters included in the first platoon driving information to one or more N-th platoon driving parameters included in the N-th platoon driving information, and (ii) selecting a target platoon driving group to be including the subject vehicle, among the first platoon driving group to the N-th platoon driving group; (c) the basement server instructing the subject vehicle to drive in a second mode corresponding to a circumstance of performing the platoon driving in the target platoon driving group.

As one example, at the step of (b), the basement server calculates a K-th platoon driving suitability score on a K-th platoon driving group by (i) referring to at least one K-th platoon driving distance parameter, at least one K-th platoon driving velocity parameter, at least one K-th platoon driving destination parameter and at least one K-th platoon driving vehicle gap parameter included in the K-th platoon driving parameters, and (ii) further referring to at least one setup distance parameter, at least one setup velocity parameter, at least one setup destination parameter and at least one setup vehicle gap parameter, which have been prescribed beforehand.

As one example, at the step of (b), the basement server calculates (i) a K-th distance score by referring to a ratio of the setup distance parameter to the K-th platoon driving distance parameter, (ii) a K-th velocity score by referring to a ratio of (r1) a safe velocity difference parameter, which is a part of the setup velocity parameter, to (r2) a difference between a planned velocity parameter, which is a part of the setup velocity parameter, and the K-th platoon driving velocity parameter, (iii) a K-th destination score by referring to a ratio of (r1) a distance corresponding to a common destination parameter generated by referring to the setup destination parameter and the K-th platoon driving destination parameter, to (r2) a distance corresponding to the setup destination parameter, and (iv) a K-th vehicle gap score by referring to a ratio of the K-th platoon driving vehicle gap parameter to the setup vehicle gap parameter, and generates the K-th platoon driving suitability score by referring to the K-th distance score, the K-th velocity score, the K-th destination score and the K-th vehicle gap score.

As one example, at the step of (b), the basement server calculates the K-th platoon driving suitability score by referring to a following formula:

$$PS_K = \begin{cases} 0, & \text{if } d_k < 1 \text{ or } v_k < 1 \text{ or } g_k < 1 \\ w_d d_k + w_v v_k + w_t t_k, & \text{else} \end{cases}$$

wherein $PS_K$ denotes the K-th platoon driving suitability score, $d_k$ denotes the K-th distance score, $v_k$ denotes the K-th velocity score, $t_k$ denotes the K-th destination score, $g_k$ denotes the K-th vehicle gap score, and each of $w_d$, $w_v$ and $w_t$ denotes each of weights corresponding to each of the K-th distance score, the K-th velocity score and the K-th destination score.

As one example, at the step of (c), the basement server instructs the subject vehicle to perform the platoon driving in either a lead group corresponding to a first condition or a follow group corresponding to a second condition, by referring to information on whether driving intention information, included in the platoon driving request, corresponds to the first condition or the second condition, wherein the lead group and the follow group are subordinate groups of the target platoon driving group.

As one example, at the step of (c), the basement server, if the subject vehicle is included in the follow group, instructs the subject vehicle to drive in a (2-1)-st mode corresponding to an autonomous driving performed by referring to instruction information acquired from a target leader vehicle of the target platoon driving group.

As one example, at the step of (c), the basement server, if the subject vehicle is included in the lead group, (i) instructs the subject vehicle to drive in a (2-1)-st mode corresponding to an autonomous driving performed by referring to instruction information acquired from a target leader vehicle of the target platoon driving group, and (ii) in response to leader turn information of target platoon driving information, to be updated in real-time, instructs the subject vehicle, as the target leader vehicle, to drive in a (2-2)-nd mode corresponding to a semi-autonomous driving performed by a subject driver of the subject vehicle, wherein the subject vehicle transmits the instruction information to target platoon driving vehicles of the target platoon driving group.

As one example, the step of (c) includes steps of: (c1) the basement server acquiring subject vehicle category information of the subject vehicle and target platoon driving composition information of the target platoon driving group by referring to the platoon driving request and target platoon driving information on the target platoon driving group; (c2) the basement server (i) acquiring information on one or more candidate formations corresponding to the subject vehicle category information and the target platoon driving composition information by referring to a formation DB, (ii) calculating each of driving safety scores, each of driving economy scores, and each of formation modifiability scores corresponding to each of the candidate formations, to thereby calculate each of formation efficiency scores, (iii) determining at least one update formation of the target platoon driving group including the subject vehicle by referring to the formation efficiency scores; (c3) the basement server instructing the subject vehicle to drive in the second mode, at a location of the target platoon driving group corresponding to the update formation.

As one example, at the step of (c2), the basement server calculates said each of the formation modifiability scores by referring to each of predicted travelling distances, representing each of distances travelled by the subject vehicle and the target platoon driving vehicles while a formation of the target platoon driving is transformed from a current formation to each of the candidate formations, wherein the predicted travelling distances are calculated by referring to location information of the subject vehicle and information on the current formation of the target platoon driving group.

As one example, at the step of (c2), the basement server acquires said each of the driving safety scores and each of the driving economy scores by referring to the formation DB.

As one example, at the step of (c2), the basement server calculates each of weights for at least part of each of the driving safety scores, each of the driving economy scores and each of the formation modifiability scores by referring to driving tendency information on operational goals of the target platoon driving group, acquired from the target platoon driving information, and to calculate each of the formation efficiency scores by further referring to the weights.

As one example, the method further includes a step of: (d) the basement server updating target platoon driving information on the target platoon driving group included in the real-time platoon driving information DB, by referring to information on the subject vehicle.

As one example, at the step of (b), the basement server, if none the first platoon driving suitability score to the N-th platoon driving suitability score is larger than a threshold platoon driving suitability score and driving intention information corresponds to a first condition, selects a new platoon driving group including the subject vehicle as the target platoon driving group, wherein, at the step of (c), the basement server instructs the subject vehicle, as a target leader vehicle of the target platoon driving group, to drive in a (2-2)-nd mode corresponding to a semi-autonomous driving performed by a subject driver of the subject vehicle, wherein the subject vehicle transmits instruction information to target platoon driving vehicles of the target platoon driving group.

In accordance with another aspect of the present disclosure, there is provided a basement server for switching driving modes of a subject vehicle to support the subject vehicle to perform a platoon driving by using platoon driving information on platoon driving groups located near the subject vehicle, without additional instructions from a driver during a driving, which interworks with the subject vehicle driving in a first mode corresponding to a circumstance of being not included in any platoon driving groups, including: at least one memory that stores instructions; and at least one processor configured to execute the instructions to perform processes of: (I) if a platoon driving request is acquired from the subject vehicle, acquiring first platoon driving information, corresponding to a first platoon driving group including one or more first platoon driving vehicles, to N-th platoon driving information, corresponding to an N-th platoon driving group including one or more N-th platoon driving vehicles, by referring to a real-time platoon driving information DB; (II) the basement server (i) calculating a first platoon driving suitability score, corresponding to the first platoon driving group, to an N-th platoon driving suitability score, corresponding to the N-th platoon driving group, by referring to one or more first platoon driving parameters included in the first platoon driving information to one or more N-th platoon driving parameters included in the N-th platoon driving information, and (ii) selecting a target platoon driving group to be including the subject vehicle, among the first platoon driving group to the N-th platoon driving group; (III) the basement server instructing the subject vehicle to drive in a second mode corresponding to a circumstance of performing the platoon driving in the target platoon driving group.

As one example, at the process of (II), the processor calculates a K-th platoon driving suitability score on a K-th platoon driving group by (i) referring to at least one K-th platoon driving distance parameter, at least one K-th platoon driving velocity parameter, at least one K-th platoon driving destination parameter and at least one K-th platoon driving vehicle gap parameter included in the K-th platoon driving parameters, and (ii) further referring to at least one setup distance parameter, at least one setup velocity parameter, at least one setup destination parameter and at least one setup vehicle gap parameter, which have been prescribed beforehand.

As one example, at the process of (II), the processor calculates (i) a K-th distance score by referring to a ratio of the setup distance parameter to the K-th platoon driving distance parameter, (ii) a K-th velocity score by referring to a ratio of (r1) a safe velocity difference parameter, which is a part of the setup velocity parameter, to (r2) a difference between a planned velocity parameter, which is a part of the setup velocity parameter, and the K-th platoon driving velocity parameter, (iii) a K-th destination score by referring to a ratio of (r1) a distance corresponding to a common destination parameter generated by referring to the setup destination parameter and the K-th platoon driving destination parameter, to (r2) a distance corresponding to the setup destination parameter, and (iv) a K-th vehicle gap score by referring to a ratio of the K-th platoon driving vehicle gap parameter to the setup vehicle gap parameter, and generates the K-th platoon driving suitability score by referring to the K-th distance score, the K-th velocity score, the K-th destination score and the K-th vehicle gap score.

As one example, at the process of (II), the processor calculates the K-th platoon driving suitability score by referring to a following formula:

$$PS_K = \begin{cases} 0, & \text{if } d_k < 1 \text{ or } v_k < 1 \text{ or } g_k < 1 \\ w_d d_k + w_v v_k + w_t t_k, & \text{else} \end{cases}$$

wherein $PS_K$ denotes the K-th platoon driving suitability score, $d_k$ denotes the K-th distance score, $v_k$ denotes the K-th velocity score, $t_k$ denotes the K-th destination score, $g_k$ denotes the K-th vehicle gap score, and each of $w_d$, $w_v$ and $w_t$ denotes each of weights corresponding to each of the K-th distance score, the K-th velocity score and the K-th destination score.

As one example, at the process of (III), the processor instructs the subject vehicle to perform the platoon driving in either a lead group corresponding to a first condition or a follow group corresponding to a second condition, by referring to information on whether driving intention information, included in the platoon driving request, corresponds to the first condition or the second condition, wherein the lead group and the follow group are subordinate groups of the target platoon driving group.

As one example, at the process of (III), the processor, if the subject vehicle is included in the follow group, instructs the subject vehicle to drive in a (2-1)-st mode corresponding to an autonomous driving performed by referring to instruction information acquired from a target leader vehicle of the target platoon driving group.

As one example, at the process of (III), the processor, if the subject vehicle is included in the lead group, (i) instructs the subject vehicle to drive in a (2-1)-st mode corresponding to an autonomous driving performed by referring to instruction information acquired from a target leader vehicle of the target platoon driving group, and (ii) in response to leader turn information of target platoon driving information, to be updated in real-time, instructs the subject vehicle, as the target leader vehicle, to drive in a (2-2)-nd mode corresponding to a semi-autonomous driving performed by a subject driver of the subject vehicle, wherein the subject vehicle transmits the instruction information to target platoon driving vehicles of the target platoon driving group.

As one example the process of (III) includes processes of: (III1) acquiring subject vehicle category information of the subject vehicle and target platoon driving composition information of the target platoon driving group by referring to the platoon driving request and target platoon driving information on the target platoon driving group; (III2) (i) acquiring information on one or more candidate formations corresponding to the subject vehicle category information and the target platoon driving composition information by referring to a formation DB, (ii) calculating each of driving safety scores, each of driving economy scores, and each of formation modifiability scores corresponding to each of the candidate formations, to thereby calculate each of formation efficiency scores, (iii) determining at least one update formation of the target platoon driving group including the subject vehicle by referring to the formation efficiency scores; (III3) instructing the subject vehicle to drive in the second mode, at a location of the target platoon driving group corresponding to the update formation.

As one example, at the process of (III2), the processor calculates said each of the formation modifiability scores by referring to each of predicted travelling distances, representing each of distances traveled by the subject vehicle and the target platoon driving vehicles while a formation of the target platoon driving is transformed from a current formation to each of the candidate formations, wherein the predicted travelling distances are calculated by referring to location information of the subject vehicle and information on the current formation of the target platoon driving group.

As one example, at the process of (III2), the processor acquires said each of the driving safety scores and each of the driving economy scores by referring to the formation DB.

As one example, at the process of (III2), the processor calculates each of weights for at least part of each of the driving safety scores, each of the driving economy scores and each of the formation modifiability scores by referring to driving tendency information on operational goals of the target platoon driving group, acquired from the target platoon driving information, and to calculate each of the formation efficiency scores by further referring to the weights.

As one example the processor further performs a process of: (IV) updating target platoon driving information on the target platoon driving group included in the real-time platoon driving information DB, by referring to information on the subject vehicle.

As one example, at the process of (II), the processor, if none of the first platoon driving suitability score to the N-th platoon driving suitability score is larger than a threshold platoon driving suitability score and driving intention information corresponds to a first condition, selects a new platoon driving group including the subject vehicle as the target platoon driving group, wherein, at the process of (III), the processor instructs the subject vehicle, as a target leader vehicle of the target platoon driving group, to drive in a (2-2)-nd mode corresponding to a semi-autonomous driving performed by a subject driver of the subject vehicle, wherein the subject vehicle transmits instruction information to target platoon driving vehicles of the target platoon driving group.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
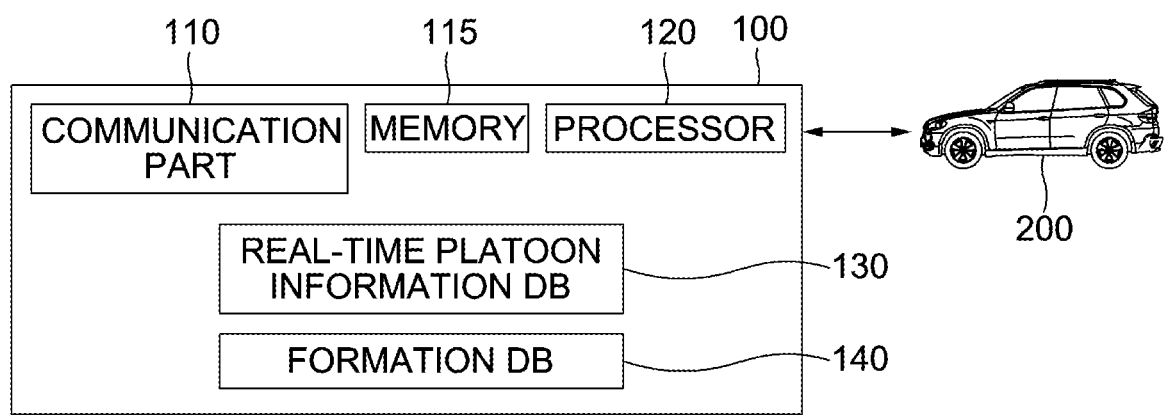
FIG. 1 is a drawing schematically illustrating a configuration of a basement server performing a method for switching driving modes of a subject vehicle to support the subject vehicle to perform a platoon driving by using platoon driving information on platoon driving groups located near the subject vehicle, without additional instructions from a driver during a driving.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a basement server performing a method for supporting safe vehicle platooning of at least one platoon without control of drivers in accordance with one example embodiment of the present disclosure.

By referring to FIG. 1, the basement server 100 may include at least one communication part 110 and at least one processor 120. Processes of input/output and computation of the basement server 100 may be respectively performed by the communication part 110 and the processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the basement server 100 does not exclude an integrated device including any combination of a processor, a memory, a medium, or any other computing components.

Also, the basement server 100 may include a real-time platoon driving information DB 130, to be explained later, and a formation DB 140. In FIG. 1, it is shown that the basement server 100 includes those inside itself, but those may be located outside of the basement server 100, and may communicate with the basement server 100.

And, the basement server 100 may interwork with the subject vehicle 200. Specifically, information may be exchanged between the basement server 100 and the subject vehicle 200, requests may be transmitted from the subject vehicle 200 to the basement server 100, or instructions may be transmitted from the basement server 100 to the subject vehicle 200.

How such basement server 100 is able to perform the method for switching driving modes of the present disclosure will be presented below briefly, by referring to FIG. 2.

Figure 2:
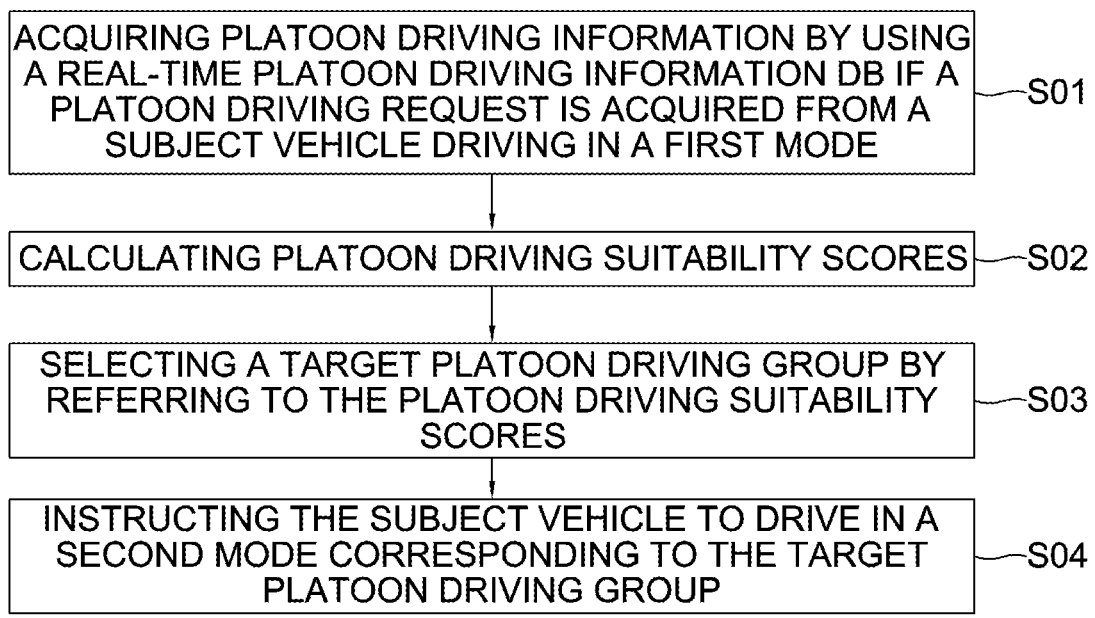
FIG. 2 is a drawing schematically illustrating a flow of the method for switching the driving modes of the subject vehicle to support the subject vehicle to perform the platoon driving by using the platoon driving information on the platoon driving groups located near the subject vehicle, without the additional instructions from a driving during the driving.

FIG. 2 is a drawing schematically illustrating a flow of the method for switching the driving modes of the subject vehicle to support the subject vehicle to perform the platoon driving by using the platoon driving information on the platoon driving groups located near the subject vehicle, without the additional instructions from a driving during the driving.

By referring to FIG. 2, it is shown that, at a step of S01, the basement server 100, if a platoon driving request is acquired from the subject vehicle driving in a first mode, acquires first platoon driving information to N-th platoon driving information, by referring to the real-time platoon driving information DB 130. Herein, the first platoon driving information to the N-th platoon driving information may correspond to a first platoon driving group to an N-th platoon driving group located near the subject vehicle 200. Thereafter, at a step of S02, the basement server 100 may generate platoon driving suitability scores, including a first platoon driving suitability score to an N-th platoon driving suitability score, and, at a step of S03 may select a target platoon driving group to be including the subject vehicle 200 by referring to the platoon driving suitability scores. After the target platoon driving group is selected, at a step of S04, the basement server 100 may instruct the subject vehicle 200 to drive in a second mode, to be explained later, corresponding to the target platoon driving group.

A brief explanation on the method for switching the modes of the subject vehicle 200 is shown above. Below, it will be explained specifically.

First, the method of the present disclosure may be applied to the subject vehicle 200 in the first mode. Herein, the first mode may correspond to a circumstance of being not included in any platoon driving groups, and it may be whatever of an autonomous driving, a semi-autonomous driving or a manual driving. The basement server 100 which interworks with the subject vehicle 200 driving in the first mode may store platoon driving information on platoon driving groups of its own responsible areas, in the real-time platoon driving information DB 130. Herein, the real-time platoon driving information DB 130 may be constantly updated by using information on locations and affiliations of platoon driving vehicles included in each of the platoon driving groups, transmitted from the platoon driving vehicles to the basement server 100.

In such circumstance, the basement server 100, if the platoon driving request is acquired from the subject vehicle, may acquire the first platoon driving information, corresponding to the first platoon driving group including one or more first platoon driving vehicles, to the N-th platoon driving information, corresponding to the N-th platoon driving group including one or more N-th platoon driving vehicles, by referring to the real-time platoon driving information DB 130. Herein, the platoon driving request may include location information of the subject vehicle 200, thus the basement server 100 may select the first platoon driving group to the N-th platoon driving group, among said platoon driving groups in its own responsible areas, located closer than a threshold distance from the subject vehicle 200 by referring to the platoon driving request, and may acquire the first platoon driving information to the N-th platoon driving information by using the real-time platoon driving information DB 130.

Thereafter, the basement server 100 may calculate a first platoon driving suitability score, corresponding to the first platoon driving group, to an N-th platoon driving suitability score, corresponding to the N-th platoon driving group, by referring to one or more first platoon driving parameters included in the first platoon driving information to one or more N-th platoon driving parameters included in the N-th platoon driving information. Those will be referred to, in order to select the target platoon driving group to be including the subject vehicle 200.

Specifically, the basement server 100 may calculate a K-th platoon driving suitability score on a K-th platoon driving group by (i) referring to at least one K-th platoon driving distance parameter, at least one K-th platoon driving velocity parameter, at least one K-th platoon driving destination parameter and at least one K-th platoon driving vehicle gap parameter included in the K-th platoon driving parameters and (ii) further referring to at least one setup distance parameter, at least one setup velocity parameter, at least one setup destination parameter and at least one setup vehicle gap parameter, which have been prescribed beforehand. K may be an integer larger than 1 and same as or smaller than N.

Herein, the K-th platoon driving distance parameter may correspond to a distance between the K-th platoon driving group and the subject vehicle 200, which can be calculated by referring to a K-th platoon driving location parameter of the K-th platoon driving information and the location information of the subject vehicle 200. The K-th platoon driving velocity parameter of the K-th platoon driving information may correspond to a velocity of the K-th platoon driving group, and the K-th platoon driving destination parameter may correspond to a destination of the K-th platoon driving group. Also, the K-th platoon driving vehicle gap parameter may correspond to gaps among the K-th platoon driving vehicles, which have been set for the K-th platoon driving group.

And, the setup distance parameter, the setup velocity parameter, the setup destination parameter and the setup vehicle gap parameters may have been inputted to the subject vehicle 200 by a subject driver thereof before driving and transmitted to the basement server 100. The setup distance parameter may represent an upper-limit desired distance of the subject driver between the subject vehicle 200 and the target platoon driving group, and the setup velocity parameter may represent how fast the subject driver wants the subject vehicle 200 to be. Also, the setup destination parameter may represent a destination where the driver wants to go, and the setup vehicle gap parameter may represent a lower-limit desired gap of the subject driver among target platoon driving vehicles of the target platoon driving group.

More specifically, the basement server 100 may calculate a K-th distance score, a K-th velocity score, a K-th destination score and a K-th vehicle gap score by referring to those. Such processes of calculating each of the scores are parallel, thus any of them may be performed first, together, or later. Below how to calculate said scores will be presented.

The basement server 100 may calculate the K-th distance score by referring to a ratio of the setup distance parameter to the K-th platoon driving distance parameter. The K-th distance score gets larger if a distance between the K-th platoon driving group and the subject vehicle 200 gets smaller than said upper-limit desired distance. Thus, the K-th distance score is used for selecting one of the platoon driving groups which is located relatively closer from the subject vehicle 100, as the target platoon driving group.

Also, the basement server 100 may calculate the K-th velocity score by referring to a ratio of (r1) a safe velocity difference parameter, which is a part of the setup velocity parameter, to (r2) a difference between a planned velocity parameter, which is a part of the setup velocity parameter, and the K-th platoon driving velocity parameter. Herein, the planned velocity parameter may represent a desired velocity of the subject vehicle 200, and the safety velocity difference parameter may represent how much the subject driver can allow a velocity of the target platoon driving group to be different from said desired velocity. By referring to the ratio, the K-th velocity score gets smaller if the difference gets smaller, thus it is used for selecting one of the platoon driving groups whose velocity is similar to said desired velocity.

And, the basement server may calculate the K-th destination score by referring to a ratio of (r1) a distance corresponding to a common destination parameter generated by referring to the setup destination parameter and the K-th platoon driving destination parameter, to (r2) a distance corresponding to the setup destination parameter. The common destination parameter may represent a distance between a current location of the subject vehicle 200 and a location where the subject vehicle 200 should leave from the K-th platoon driving group in order to go to its own destination. By referring to the ratio, the K-th destination score gets larger if the distance corresponding to the common destination parameter gets larger. Thus, it is used for selecting one of the platoon driving groups in which the subject vehicle 200 can be included for a longest time, as the target platoon driving group.

Finally, the basement server 100 may calculate the K-th vehicle gap score by referring to a ratio of the K-th platoon driving vehicle gap parameter to the setup vehicle gap parameter. By referring to the ratio, the K-th platoon driving vehicle gap parameter gets larger if the K-th platoon driving vehicle gap parameter gets larger than the setup vehicle gap parameter. In the platoon driving, too small vehicle gaps among platoon driving vehicles may cause danger in urgent situations, such as sudden stoppings of the platoon driving vehicles. Thus, the K-th vehicle gap score may be used for selecting one of the platoon driving groups whose vehicle gap is properly set that it may not cause excessive danger, as the target platoon driving group.

After the K-th distance score, the K-th velocity score, the K-th destination score and the K-th vehicle gap score are generated, the K-th platoon driving suitability score can be generated by referring thereto.

Specifically, the basement server 100 may calculate the K-th platoon driving suitability score by referring to a following formula:

$$PS_K = \begin{cases} 0, & \text{if } d_k < 1 \text{ or } v_k < 1 \text{ or } g_k < 1 \\ w_d d_k + w_v v_k + w_t t_k, & \text{else} \end{cases}$$

Herein, $PS_K$ may denote the K-th platoon driving suitability score, $d_k$ may denote the K-th distance score, $v_k$ may denotes the K-th velocity score, $t_k$ may denote the K-th destination score, $g_k$ may denote the K-th vehicle gap score, and each of $w_d$, $w_v$ and $w_t$ may denote each of weights corresponding to each of the K-th distance score, the K-th velocity score and the K-th destination score.

Below, the formula will be explained more specifically. First, if any of $d_k$, $v_k$ and $g_k$ is smaller than 1, the K-th platoon driving suitability score may be calculated as 0, by referring the formula. This condition is used for binary filtering. That is, some of the platoon driving groups which are too far away from the subject vehicle 200 can be filtered by using the above condition, because the K-th distance score $d_k$ is calculated smaller than 1 if the distance between the subject vehicle 200 and the K-th platoon driving group is larger than the distance corresponding to the setup distance parameter. Also, some of the platoon driving groups which are too slow or too fast can be filtered because the K-th velocity score $v_k$ is calculated smaller than 1 if a difference between a velocity of the K-th platoon driving group and the desired velocity of the subject vehicle 200 is not allowable for the subject driver. Similarly, the K-th vehicle gap score $g_k$ may be calculated as smaller than 1 if vehicle gaps of the K-th platoon driving vehicles are felt dangerous by the subject driver, thus some of the platoon driving groups with too small vehicle gaps can be filtered.

If all of $d_k$, $v_k$ and $g_k$ are larger than 1, by calculating a weighted sum of the K-th distance score, the K-th velocity score, the K-th destination score and the K-th vehicle gap score with $w_d$, $w_v$ and $w_t$, the K-th platoon driving suitability score can be generated and referred to, in order to select the target platoon driving group. Below, one example of calculating the K-th platoon driving suitability score will be presented by referring to FIG. 3.

Figure 3:
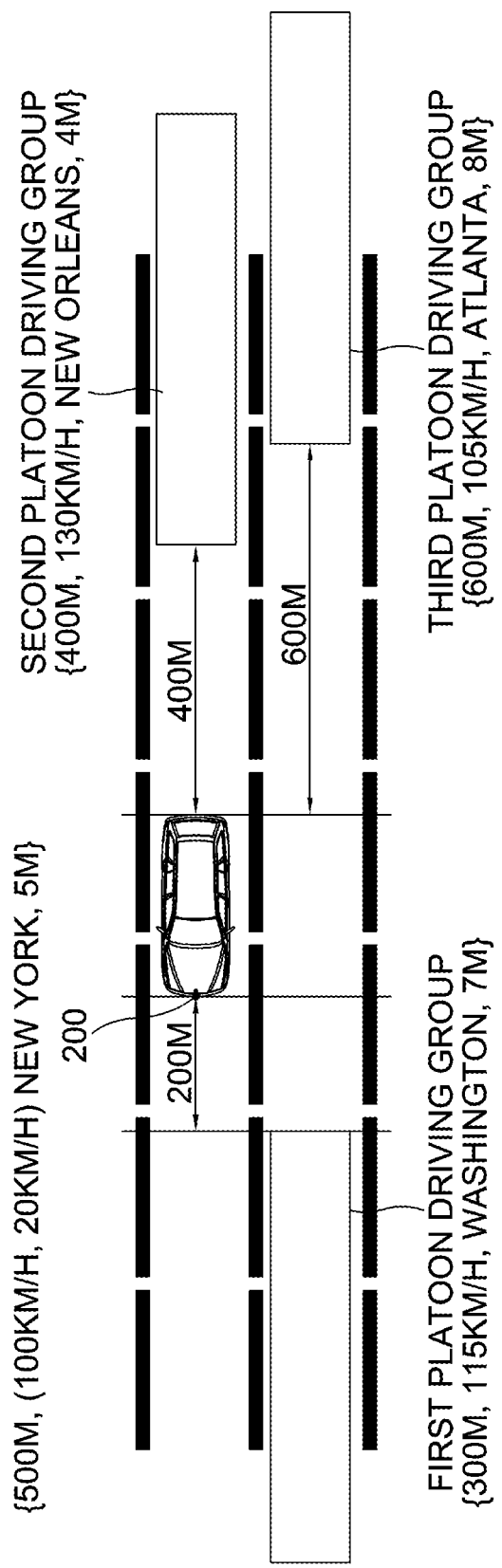
FIG. 3 is a drawing schematically illustrating an example of a process of calculating a K-th platoon driving suitability score to be used for performing the method for switching the driving modes of the subject vehicle to support the subject vehicle to perform the platoon driving by using the platoon driving information on the platoon driving groups located near the subject vehicle, without the additional instructions from a driving during the driving.

FIG. 3 is a drawing schematically illustrating an example of a process of calculating a K-th platoon driving suitability score to be used for performing the method for switching the driving modes of the subject vehicle to support the subject vehicle to perform the platoon driving by using the platoon driving information on the platoon driving groups located near the subject vehicle, without the additional instructions from a driving during the driving.

In FIG. 3, there is presented a circumstance of the subject vehicle 200 located in a highway near Los Angeles having transmitted the platoon driving request. Herein, the setup velocity parameter is set as (100 km/h, 20 km/h), having the planned velocity parameter and the safe velocity difference parameter as its components, and the setup distance parameter is set as 500 m. Also, the setup destination parameter corresponds to New York, and the setup vehicle gap parameter is set as 5 m.

Further, a first platoon driving distance parameter of the first platoon driving group is 300 m, a first platoon driving velocity parameter is 115 km/h, a first platoon driving destination parameter is Washington, and the first platoon driving vehicle gap parameter is 7 m. Similarly, a second platoon driving distance parameter of the second platoon driving group is 400 m, a second platoon driving velocity parameter is 130 km/h, a second platoon driving destination parameter is New Orleans, and the second platoon driving vehicle gap parameter is 4 m. Also, a third platoon driving distance parameter of the third platoon driving group is 600 m, a third platoon driving velocity parameter is 105 km/h, a third platoon driving destination parameter is Atlanta, and the third platoon driving vehicle gap parameter is 8 m.

In this circumstance, a second platoon driving suitability score is calculated as 0, since a second vehicle gap score is calculated as smaller than 1. Also, a third platoon driving suitability score is calculated as 0, since a third distance score is calculated as smaller than 1. But, a first platoon driving suitability score is not calculated as 0, thus the first platoon driving group can be selected as the target platoon driving group.

After the target platoon driving group is selected, the basement server 100 may instruct the subject vehicle 200 to drive in the second mode corresponding to a circumstance of performing the platoon driving in the target platoon driving group. Specifically, by referring to driving intention information in the platoon driving request, the subject vehicle 200 may drive in a (2-1)-st mode or a (2-2)-nd mode. Herein, the driving intention information may represent whether the subject driver is willing to drive the subject vehicle 200 as a target leader vehicle of the target platoon driving group or not.

That is, the basement server 100 may select either a lead group corresponding to a first condition or a follow group corresponding to a second condition, by referring to information on whether the driving intention information corresponds to the first condition or the second condition. Herein, the lead group and the follow group may be subordinate groups of the target platoon driving group, and include the subject vehicle 200. The first condition may represent that the subject vehicle 200 can take a role of the target leader vehicle of the target platoon driving group, and the second condition may represent that it cannot take said role. Accordingly, the lead group may include candidate leader vehicles to be substituting the target leader vehicle of a current timing in case the target leader vehicle of the current timing leaves the target platoon driving group or stops leading the target platoon driving group, and the follow group may include follower vehicles only to be driving automatically by referring to instruction information from the target leader vehicle. As one example, the lead group may be located in front of the follow group.

If the subject vehicle is included in the follow group, the basement server 100 may instruct the subject vehicle 200 to drive in the (2-1)-st mode corresponding to an autonomous driving performed by referring to the instruction information acquired from the target leader vehicle of the target platoon driving group.

On the contrary, if the subject vehicle is included in the lead group, the basement server 100 may instruct the subject vehicle 100 to drive in the (2-1)-st mode first. Thereafter, the basement server 100 may constantly check out whether a condition of leader turn information of the target platoon driving information, to be updated in real-time, has been switched from a third condition to a fourth condition or not. Herein, the leader turn information may represent an order for taking the role of the target leader vehicle, the third condition may denote that it is not a turn for the subject vehicle 200 to become the target leader vehicle, and the fourth condition may denote that it is a turn for the subject vehicle 200 to become the target leader vehicle. If the condition is switched, the basement server 100 may instruct the subject vehicle 200, as the target leader vehicle, to drive in a (2-2)-nd mode corresponding to a semi-autonomous driving performed by a subject driver of the subject vehicle. Herein, the subject vehicle 200 may transmit the instruction information to target platoon driving vehicles of the target platoon driving group. That is, if the target leader vehicle already exists, the subject vehicle 200 just drives automatically by acquiring the instruction information. However, after a leading turn comes, the subject vehicle 200 drives as the target leader vehicle. When the subject vehicle 200 is driven as the target leader vehicle, it may be driven in a semi-autonomous driving mode, which corresponds to a manual driving of the subject driver, being assisted by a vehicle system. Herein, the third condition may correspond to a circumstance of the subject vehicle 200 not being the target leader vehicle yet, and the fourth condition may correspond to a circumstance of the subject vehicle 200 being the target leader vehicle. Such leader turn information can be updated while the target platoon driving information is updated by the target platoon driving vehicles.

As the subject vehicle 200 is included in the target platoon driving group, a location of the subject vehicle inside the target platoon driving group should be determined. Below how to determine such location will be presented.

The basement server 100 may acquire subject vehicle category information of the subject vehicle 200 and target platoon driving composition information of the target platoon driving group by referring to the platoon driving request and the target platoon driving information on the target platoon driving group. For example, the vehicle category information may denote whether the subject vehicle 200 is one of passenger vehicles or one of luggage vehicles, and the target platoon driving composition information may denote how many passenger vehicles and luggage vehicles are existing in the target platoon driving group currently.

Then, the basement server 100 may acquire information on one or more candidate formations corresponding to the subject vehicle category information and the target platoon driving composition information by referring to the formation DB 140. That is, the subject vehicle category information and the target platoon driving composition information can be referred to, in order to check out how many passenger vehicles and luggage vehicles are existing in the target platoon driving group if the subject vehicle is added thereto. Thereafter, the basement server 100 may calculate each of driving safety scores, each of driving economy scores, and each of formation modifiability scores corresponding to each of the candidate formations, to thereby calculate each of formation efficiency scores. And those can be used for determining an update formation for the target platoon driving group, among the candidate formations. Processes of calculating the formation efficiency scores will be explained below, after processes of calculating the driving safety scores, the driving economy scores and the formation modifiability scores are explained.

First, in order to calculate the modifiability scores, the basement server 100 may calculate each of predicted travelling distances, representing each of distances travelled by the subject vehicle 200 and the target platoon driving vehicles while a formation of the target platoon driving is transformed from a current formation to each of the candidate formations, by referring to the location information of the subject vehicle 200 and information on the current formation of the target platoon driving group. After the predicted travelling distances are calculated, the basement server 100 may use those to calculate each of the formation modifiability scores corresponding to each of candidate formations. For example, the predicted travelling distances and the formation modifiability scores may be inversely proportional. Such inverse proportional relationship may hold because it will be much safer to change its formation when it requires less distance for its affiliated vehicles to move.

Otherwise, each of the driving safety scores and each of the driving economy scores can be acquired by referring to the formation DB 140. The driving safety scores and the driving economy scores may have been generated and stored in the formation DB 140 beforehand. The driving safety scores may correspond to (i) probabilities of an occurrence of an accident and (ii) damages of the probable accident if the target platoon driving vehicles are driven in their corresponding candidate formations. The driving economy scores may correspond to fuel efficiencies of the candidate formations.

After the formation modifiability scores, the driving safety scores and the driving economy scores are acquired, the basement server 100 may calculate the formation efficiency scores by referring to the formation modifiability scores, the driving safety scores and the driving economy scores. More specifically, the basement server 100 may acquire driving tendency information, from the target platoon driving information, on operational goals of the target platoon driving group, and may calculate each of weights for at least part of each of the driving safety scores, each of the driving economy scores and each of the formation modifiability scores by referring to the driving tendency information. Herein, the driving tendency information may represent the operational goals that the target platoon driving group wants to achieve during the platoon driving. For example, some of the platoon driving groups may seek fuel efficiency, other platoon driving groups may seek safety, or the other platoon driving groups may seek smallest distance required for transforming their formations. The basement server can reflect those operational goals to processes of calculating the weights, and calculate the formation efficiency scores by further referring to the weights. An example of calculating the formation efficiency scores can be seen in FIG. 4.

Figure 4:
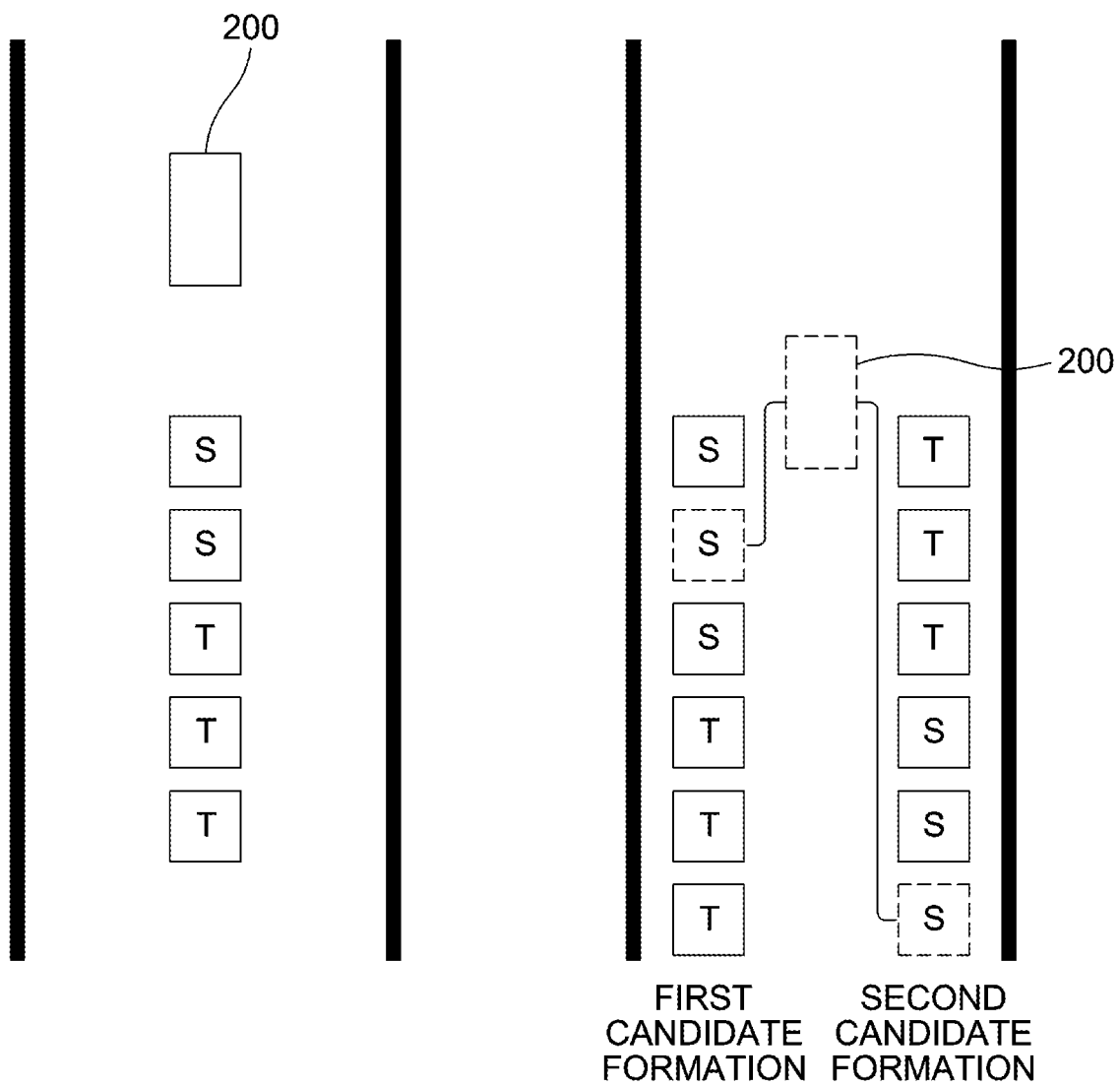
FIG. 4 is a drawing schematically illustrating an example of a process of calculating formation efficiency scores to be used for performing the method for switching the driving modes of the subject vehicle to support the subject vehicle to perform the platoon driving by using the platoon driving information on the platoon driving groups located near the subject vehicle, without the additional instructions from a driving during the driving.

FIG. 4 is a drawing schematically illustrating an example of a process of calculating formation efficiency scores to be used for performing the method for switching the driving modes of the subject vehicle to support the subject vehicle to perform the platoon driving by using the platoon driving information on the platoon driving groups located near the subject vehicle, without the additional instructions from a driving during the driving.

By referring to FIG. 4, it can be seen that the current formation of the target platoon driving group is sedan-sedan-truck-truck-truck, and the subject vehicle 200, which is a sedan, one of the passenger vehicles, is located in front of the target platoon driving group. In this case, a first predicted travelling distance, corresponding to a first candidate formation of sedan-sedan-sedan-truck-truck-truck, may be calculated as relatively smaller, because the subject vehicle 200 can be just located in a frontal part of the target platoon driving group in its current formation. On the contrary, a second predicted travelling distance, corresponding to a second candidate formation of truck-truck-truck-sedan-sedan-sedan, may be calculated as relatively larger, because the subject vehicle 200 should be located in a rear part of the target platoon driving group, and the target platoon driving vehicles should change their positions. Thus a first formation modifiability score, corresponding to the first candidate formation, may be calculate as larger than a second formation modifiability score, corresponding to the second candidate formation.

However, a first driving safety score corresponding to the first candidate formation may be calculated as relatively smaller, because the trucks in the rear part may collide the sedans from behind when stopping suddenly, due to difficulty in braking of the trucks. Also, a first driving economy score corresponding to the first candidate formation may be calculated as relatively smaller because sedans in the frontal part cannot reduce air resistance as much as the trucks. On the contrary, a second driving safety score and a second driving economy score both corresponding to the second candidate formation may be calculated as relatively larger, because sedans brake better than trucks, and the trucks in the frontal part can reduce the air resistance. If said operational goal of the target platoon driving group is on a safety or an economy, weights for the driving safety scores and driving economy scores may be relatively larger, so the second driving efficiency score may be calculated as relatively larger than the first driving efficiency score, thus the second candidate formation may be selected as the update formation.

After the update formation is selected, the basement server 100 may instruct the subject vehicle 200 to drive in the second mode, at a location of the target platoon driving group corresponding to the update formation.

As such process of supporting the subject vehicle 200 to perform the platoon driving in the target platoon driving group is completed, the basement server 100 may update the target platoon driving information on the platoon driving group in the real-time platoon driving information DB 130, by referring to information on the subject vehicle 200.

Hereinafter, an additional embodiment of the present disclosure will be presented. First, if none of the formation efficiency scores is larger than a threshold formation efficiency score, instead of the currently selected target platoon driving group, the basement server 100 may select another platoon driving group whose platoon driving suitability score is the second largest, as a new target platoon driving group, and perform a rest part of the method of the present disclosure.

And, if none of the first platoon driving suitability score to the N-th platoon driving suitability score is larger than a threshold platoon driving suitability score, or if said another platoon driving group should be selected as the new target platoon driving group but its second largest platoon driving suitability score is not larger than the threshold platoon driving suitability score, below processes can be performed.

That is, in this case, the basement server 100, if the driving intention information corresponds to the first condition, may select a new platoon driving group including the subject vehicle as the target platoon driving group. To be simple, the new platoon driving group including only the subject vehicle 200 can be generated and selected as the target platoon driving group by the basement server 100.

Thereafter, the basement server 100 may instruct the subject vehicle 200, as the target leader vehicle of the target platoon driving group, to drive in the (2-2)-nd mode. If a new vehicle joins the target platoon driving group, it may acquire the instruction information from the subject vehicle 200.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for switching driving modes of a subject vehicle to support the subject vehicle to perform a platoon driving by using platoon driving information on platoon driving groups located near the subject vehicle, without additional instructions from a driver during a driving, comprising steps of:
   (a) a basement server, which interworks with the subject vehicle driving in a first mode corresponding to a circumstance of being not included in any platoon driving groups, if a platoon driving request is acquired from the subject vehicle, acquiring first platoon driving information, corresponding to a first platoon driving group including one or more first platoon driving vehicles, to N-th platoon driving information, corresponding to an N-th platoon driving group including one or more N-th platoon driving vehicles, by referring to a real-time platoon driving information database ("DB");
   (b) the basement server (i) calculating a first platoon driving suitability score, corresponding to the first platoon driving group, to an N-th platoon driving suitability score, corresponding to the N-th platoon driving group, by referring to one or more first platoon driving parameters included in the first platoon driving information to one or more N-th platoon driving parameters included in the N-th platoon driving information, and (ii) selecting a target platoon driving group to be including the subject vehicle, among the first platoon driving group to the N-th platoon driving group;
   (c) the basement server instructing the subject vehicle to drive in a second mode corresponding to a circumstance of performing the platoon driving in the target platoon driving group.

2. The method of claim 1, wherein, at the step of (b), the basement server calculates a K-th platoon driving suitability score on a K-th platoon driving group by (i) referring to at least one K-th platoon driving distance parameter, at least one K-th platoon driving velocity parameter, at least one K-th platoon driving destination parameter and at least one K-th platoon driving vehicle gap parameter included in the K-th platoon driving parameters, and (ii) further referring to at least one setup distance parameter, at least one setup velocity parameter, at least one setup destination parameter and at least one setup vehicle gap parameter, which have been prescribed beforehand.

3. The method of claim 2, wherein, at the step of (b), the basement server calculates (i) a K-th distance score by referring to a ratio of the setup distance parameter to the K-th platoon driving distance parameter, (ii) a K-th velocity score by referring to a ratio of (r1) a safe velocity difference parameter, which is a part of the setup velocity parameter, to (r2) a difference between a planned velocity parameter, which is a part of the setup velocity parameter, and the K-th platoon driving velocity parameter, (iii) a K-th destination score by referring to a ratio of (r1) a distance corresponding to a common destination parameter generated by referring to the setup destination parameter and the K-th platoon driving destination parameter, to (r2) a distance corresponding to the setup destination parameter, and (iv) a K-th vehicle gap score by referring to a ratio of the K-th platoon driving vehicle gap parameter to the setup vehicle gap parameter, and generates the K-th platoon driving suitability score by referring to the K-th distance score, the K-th velocity score, the K-th destination score and the K-th vehicle gap score.

4. The method of claim 3, wherein, at the step of (b), the basement server calculates the K-th platoon driving suitability score by referring to a following formula:

$$PS_K = \begin{cases} 0, & \text{if } d_k < 1 \text{ or } v_k < 1 \text{ or } g_k < 1 \\ w_d d_k + w_v v_k + w_t t_k, & \text{else} \end{cases}$$

wherein $PS_K$ denotes the K-th platoon driving suitability score, $d_k$ denotes the K-th distance score, $v_k$ denotes the K-th velocity score, $t_k$ denotes the K-th destination score, $g_k$ denotes the K-th vehicle gap score, and each of $w_d$, $w_v$ and $w_t$ denotes each of weights corresponding to each of the K-th distance score, the K-th velocity score and the K-th destination score.

5. The method of claim 1, wherein, at the step of (c), the basement server instructs the subject vehicle to perform the platoon driving in either a lead group corresponding to a first condition or a follow group corresponding to a second condition, by referring to information on whether driving intention information, included in the platoon driving request, corresponds to the first condition or the second condition, wherein the lead group and the follow group are subordinate groups of the target platoon driving group.

6. The method of claim 5, wherein, at the step of (c), the basement server, if the subject vehicle is included in the follow group, instructs the subject vehicle to drive in a (2-1)-st mode corresponding to an autonomous driving performed by referring to instruction information acquired from a target leader vehicle of the target platoon driving group.

7. The method of claim 5, wherein, at the step of (c), the basement server, if the subject vehicle is included in the lead group, (i) instructs the subject vehicle to drive in a (2-1)-st mode corresponding to an autonomous driving performed by referring to instruction information acquired from a target leader vehicle of the target platoon driving group, and (ii) in response to leader turn information of target platoon driving information, to be updated in real-time, instructs the subject vehicle, as the target leader vehicle, to drive in a (2-2)-nd mode corresponding to a semi-autonomous driving performed by a subject driver of the subject vehicle, wherein the subject vehicle transmits the instruction information to target platoon driving vehicles of the target platoon driving group.

8. The method of claim 1, wherein the step of (c) includes steps of:

(c1) the basement server acquiring subject vehicle category information of the subject vehicle and target platoon driving composition information of the target platoon driving group by referring to the platoon driving request and target platoon driving information on the target platoon driving group;

(c2) the basement server (i) acquiring information on one or more candidate formations corresponding to the subject vehicle category information and the target platoon driving composition information by referring to a formation DB, (ii) calculating each of driving safety scores, each of driving economy scores, and each of formation modifiability scores corresponding to each of the candidate formations, to thereby calculate each of formation efficiency scores, (iii) determining at least one update formation of the target platoon driving group including the subject vehicle by referring to the formation efficiency scores; and (c3) the basement server instructing the subject vehicle to drive in the second mode, at a location of the target platoon driving group corresponding to the update formation.

9. The method of claim 8, wherein, at the step of (c2), the basement server calculates said each of the formation modifiability scores by referring to each of predicted travelling distances, representing each of distances travelled by the subject vehicle and the target platoon driving vehicles while a formation of the target platoon driving is transformed from a current formation to each of the candidate formations, wherein the predicted travelling distances are calculated by referring to location information of the subject vehicle and information on the current formation of the target platoon driving group.

10. The method of claim 8, wherein, at the step of (c2), the basement server acquires said each of the driving safety scores and each of the driving economy scores by referring to the formation DB.

11. The method of claim 8, wherein, at the step of (c2), the basement server calculates each of weights for at least part of each of the driving safety scores, each of the driving economy scores and each of the formation modifiability scores by referring to driving tendency information on operational goals of the target platoon driving group, acquired from the target platoon driving information, and to calculate each of the formation efficiency scores by further referring to the weights.

12. The method of claim 1, further comprising a step of:
(d) the basement server updating target platoon driving information on the target platoon driving group included in the real-time platoon driving information DB, by referring to information on the subject vehicle.

13. The method of claim 1, wherein, at the step of (b), the basement server, if none of the first platoon driving suitability score to the N-th platoon driving suitability score is larger than a threshold platoon driving suitability score and driving intention information corresponds to a first condition, selects a new platoon driving group including the subject vehicle as the target platoon driving group,
wherein, at the step of (c), the basement server instructs the subject vehicle, as a target leader vehicle of the target platoon driving group, to drive in a (2-2)-nd mode corresponding to a semi-autonomous driving performed by a subject driver of the subject vehicle, wherein the subject vehicle transmits instruction information to target platoon driving vehicles of the target platoon driving group.

14. A basement server for switching driving modes of a subject vehicle to support the subject vehicle to perform a platoon driving by using platoon driving information on platoon driving groups located near the subject vehicle, without additional instructions from a driver during a driving, which interworks with the subject vehicle driving in a first mode corresponding to a circumstance of being not included in any platoon driving groups, comprising:
at least one memory that stores instructions; and
at least one processor configured to execute the instructions to perform processes of: (I) if a platoon driving request is acquired from the subject vehicle, acquiring first platoon driving information, corresponding to a first platoon driving group including one or more first platoon driving vehicles, to N-th platoon driving information, corresponding to an N-th platoon driving group including one or more N-th platoon driving vehicles, by referring to a real-time platoon driving information database ("DB"); (II) the basement server (i) calculating a first platoon driving suitability score, corresponding to the first platoon driving group, to an N-th platoon driving suitability score, corresponding to the N-th platoon driving group, by referring to one or more first platoon driving parameters included in the first platoon driving information to one or more N-th platoon driving parameters included in the N-th platoon driving information, and (ii) selecting a target platoon driving group to be including the subject vehicle, among the first platoon driving group to the N-th platoon driving group; (III) the basement server instructing the subject vehicle to drive in a second mode corresponding to a circumstance of performing the platoon driving in the target platoon driving group.

15. The basement server of claim 14, wherein, at the process of (II), the processor calculates a K-th platoon driving suitability score on a K-th platoon driving group by (i) referring to at least one K-th platoon driving distance parameter, at least one K-th platoon driving velocity parameter, at least one K-th platoon driving destination parameter and at least one K-th platoon driving vehicle gap parameter included in the K-th platoon driving parameters, and (ii) further referring to at least one setup distance parameter, at least one setup velocity parameter, at least one setup destination parameter and at least one setup vehicle gap parameter, which have been prescribed beforehand.

16. The basement server of claim 15, wherein, at the process of (II), the processor calculates (i) a K-th distance score by referring to a ratio of the setup distance parameter to the K-th platoon driving distance parameter, (ii) a K-th velocity score by referring to a ratio of (r1) a safe velocity difference parameter, which is a part of the setup velocity parameter, to (r2) a difference between a planned velocity parameter, which is a part of the setup velocity parameter, and the K-th platoon driving velocity parameter, (iii) a K-th destination score by referring to a ratio of (r1) a distance corresponding to a common destination parameter generated by referring to the setup destination parameter and the K-th platoon driving destination parameter, to (r2) a distance corresponding to the setup destination parameter, and (iv) a K-th vehicle gap score by referring to a ratio of the K-th platoon driving vehicle gap parameter to the setup vehicle gap parameter, and generates the K-th platoon driving suitability score by referring to the K-th distance score, the K-th velocity score, the K-th destination score and the K-th vehicle gap score.

17. The basement server of claim 16, wherein, at the process of (II), the processor calculates the K-th platoon driving suitability score by referring to a following formula:

$$PS_K = \begin{cases} 0, & \text{if } d_k < 1 \text{ or } v_k < 1 \text{ or } g_k < 1 \\ w_d d_k + w_v v_k + w_t t_k, & \text{else} \end{cases}$$

wherein $PS_K$ denotes the K-th platoon driving suitability score, $d_k$ denotes the K-th distance score, $v_k$ denotes the K-th velocity score, $t_k$ denotes the K-th destination score, $g_k$ denotes the K-th vehicle gap score, and each of $w_d$, $w_v$ and $w_t$ denotes each of weights corresponding to each of the K-th distance score, the K-th velocity score and the K-th destination score.

18. The basement server of claim 14, wherein, at the process of (III), the processor instructs the subject vehicle to perform the platoon driving in either a lead group corresponding to a first condition or a follow group corresponding to a second condition, by referring to information on whether driving intention information, included in the platoon driving request, corresponds to the first condition or the second condition, wherein the lead group and the follow group are subordinate groups of the target platoon driving group.

19. The basement server of claim 18, wherein, at the process of (III), the processor, if the subject vehicle is included in the follow group, instructs the subject vehicle to drive in a (2-1)-st mode corresponding to an autonomous driving performed by referring to instruction information acquired from a target leader vehicle of the target platoon driving group.

20. The basement server of claim 18, wherein, at the process of (III), the processor, if the subject vehicle is included in the lead group, (i) instructs the subject vehicle to drive in a (2-1)-st mode corresponding to an autonomous driving performed by referring to instruction information acquired from a target leader vehicle of the target platoon driving group, and (ii) in response to leader turn information of target platoon driving information, to be updated in real-time, instructs the subject vehicle, as the target leader vehicle, to drive in a (2-2)-nd mode corresponding to a semi-autonomous driving performed by a subject driver of the subject vehicle, wherein the subject vehicle transmits the instruction information to target platoon driving vehicles of the target platoon driving group.

21. The basement server of claim 14, wherein the process of (III) includes processes of:
(III1) acquiring subject vehicle category information of the subject vehicle and target platoon driving composition information of the target platoon driving group by referring to the platoon driving request and target platoon driving information on the target platoon driving group;
(III2) (i) acquiring information on one or more candidate formations corresponding to the subject vehicle category information and the target platoon driving composition information by referring to a formation DB, (ii) calculating each of driving safety scores, each of driving economy scores, and each of formation modifiability scores corresponding to each of the candidate formations, to thereby calculate each of formation efficiency scores, (iii) determining at least one update formation of the target platoon driving group including the subject vehicle by referring to the formation efficiency scores;
(III3) instructing the subject vehicle to drive in the second mode, at a location of the target platoon driving group corresponding to the update formation.

22. The basement server of claim 21, wherein, at the process of (III2), the processor calculates said each of the formation modifiability scores by referring to each of predicted travelling distances, representing each of distances travelled by the subject vehicle and the target platoon driving vehicles while a formation of the target platoon driving is transformed from a current formation to each of the candidate formations, wherein the predicted travelling distances are calculated by referring to location information of the subject vehicle and information on the current formation of the target platoon driving group.

23. The basement server of claim 21, wherein, at the process of (III2), the processor acquires said each of the driving safety scores and each of the driving economy scores by referring to the formation DB.

24. The basement server of claim 21, wherein, at the process of (III2), the processor calculates each of weights for at least part of each of the driving safety scores, each of the driving economy scores and each of the formation modifiability scores by referring to driving tendency information on operational goals of the target platoon driving group, acquired from the target platoon driving information, and to calculate each of the formation efficiency scores by further referring to the weights.

25. The basement server of claim 14, wherein the processor further performs a process of:
(IV) updating target platoon driving information on the target platoon driving group included in the real-time platoon driving information DB, by referring to information on the subject vehicle.

26. The basement server of claim 14, wherein, at the process of (II), the processor, if none of the first platoon driving suitability score to the N-th platoon driving suitability score is larger than a threshold platoon driving suitability score and driving intention information corresponds to a first condition, selects a new platoon driving group including the subject vehicle as the target platoon driving group,
wherein, at the process of (III), the processor instructs the subject vehicle, as a target leader vehicle of the target platoon driving group, to drive in a (2-2)-nd mode corresponding to a semi-autonomous driving performed by a subject driver of the subject vehicle, wherein the subject vehicle transmits instruction information to target platoon driving vehicles of the target platoon driving group.

* * * * *